United States Patent Office 2,844,577
Patented July 22, 1958

2,844,577

PURINE DERIVATIVES

Donald S. Acker, Brookside Park, Del., assignor to E. I. du Pont de Nemours and Company, Wilmington, Del., a corporation of Delaware No Drawing. Application May 16, 1956
Serial No. 585,179

6 Claims. (Cl. 260—254)

This invention relates to purines.

Purine compounds are widely distributed in both plants and animals. Some of the purines are end products, e. g., uric acid. The purine ring system exists in some of the glycosides. The purine ring system is likewise found in nucleic acids, e. g., adenine and guanine. Perhaps more widely known are purine compounds such as xanthine and its derivatives which are classed as alkaloids, namely, caffeine and theobromine. Purine compounds, therefore, are an important constituent of naturally occurring organic material and influence the activity of both plant and animal organisms.

This invention has as an object the preparation of biologically active purines. A further object is the provision of new purines having plant regulant activity. Other objects will appear hereinafter.

These objects are accomplished by the present invention of new purines having on the 6 carbon a hydroxyalkylamino, mercaptoalkylamino, alkoxyalkylamino, or alkylthioalkylamino group.

The preferred compounds have either hydrogen or chlorine in the 2- and 8-positions. They are represented by the formula

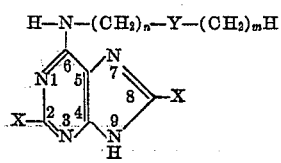

where X is hydrogen or chlorine, Y is oxygen or sulfur, $n$ is an integer of 2–3 and $m$ is a cardinal number of 0–4. Particularly preferred are those wherein $m$ has a value of at least 1.

The compounds of this invention can be obtained by the reaction of a purine which has a lower alkyl mercapto or halogen in the 6-position with an alkanolamine having the hydroxyl and amino groups on different carbons, ethanolamine or propanolamine, a lower (1–4 carbon) alkyl ether of such amines, a thiolamine, having the mercapto and amino groups on different carbons, e. g., 2-mercaptoethylamine, or a lower alkyl thioether of the latter type.

The following examples in which parts are by weight are illustrative of the invention.

EXAMPLE I 6-(2-hydroxyethylamino)purine

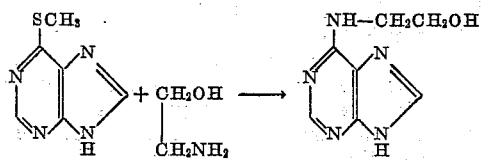

A solution of 10 parts of 6-methylmercaptopurine in 50 parts of ethanolamine was heated under reflux for five hours. The solution was concentrated to a small volume, cooled and diluted with ethanol. After chilling, the solution yielded 7.2 parts of 6-(2-hydroxyethylamino)purine, M. P. 248–250° C. An analytical sample, M. P. 251–253.5° C., was prepared by recrystallization from ethanol.

Analysis.—Calculated for $C_7H_9ON_5$: C, 46.81%; H, 5.06%; N, 39.09%. Found: C, 46.93%; H, 5.03%; N, 38.06%.

EXAMPLE II 6-(2-methoxyethylamino)purine

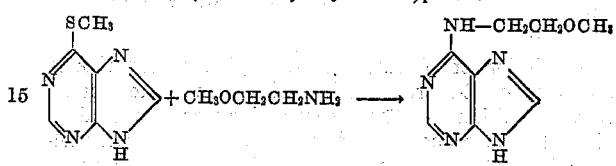

A mixture containing 10.6 parts of 6-methylmercaptopurine, 100 parts of a 65% solution of β-methoxyethylamine, and 100 parts of water was heated at 160° C. for 10 hours in a rocker bomb. The resulting mixture was filtered, and the filtrates evaporated to dryness to yield a solid which was crystallized from water and then ethanol to give 8.0 parts of crystals, M. P. 222.5° C. One recrystallization from aqueous ethanol and one crystallization from a mixture of ethanol and dimethylformamide gave 6-(2-methoxyethylamino)purine as a colorless solid (plates), M. P. 221.5–223° C.

Analysis.—Calculated for $C_8H_{11}ON_5$: C, 49.73%; H, 5.74%; N, 36.26%. Found: C, 49.27%; H, 5.83%; N, 36.07%.

EXAMPLE III 2,8-dichloro-6-(2-methoxyethylamino)purine

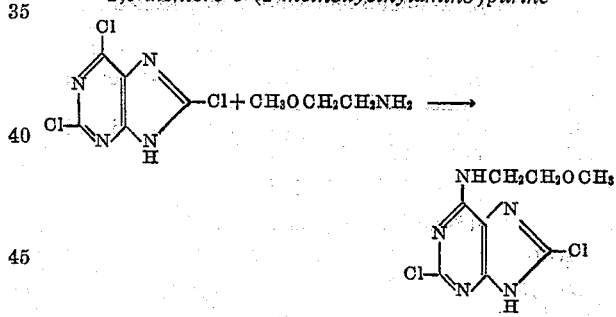

A mixture of 10 parts of 2,6,8-trichloropurine and 20 parts of a 65% aqueous solution of β-methoxyethylamine was heated under reflux for one hour. The solution was brought to pH 6–7 by the addition of hydrochloric acid and then chilled. Recrystallization from ethanol gave 5.1 parts of 2,8-dichloro-6-(2-methoxyethylamino)purine, M. P. 191–192.5° C. An analytical sample, M. P. 193–194° C., was prepared by recrystallization from methanol.

Analysis.—Calculated for $C_8H_9OCl_2N_5$: C, 36.66%; H, 3.46%. Found: C, 37.00%; H, 3.65%.

EXAMPLE IV 6-(2-ethoxyethylamino)purine

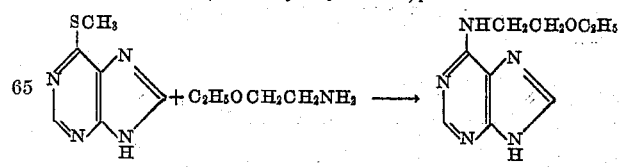

As solution of 10 parts of 6-methylmercaptopurine in 50 parts of β-ethoxyethylamine was heated under a reflux for 45 hours. The excess amine was recovered by distillation at reduced pressure, and the residue recrystallized from aqueous ethanol to give 5.5 parts of 6-(2-ethoxyethylamino)purine, M. P. 173–177° C. An analytical sample, M. P. 184–185° C., was prepared by recrystallization from ethyl acetate.

Analysis.—Calculated for $C_9H_{13}ON_5$: C, 52.26%; H, 6.32%; N, 33.79%. Found: C, 52.34%; H, 6.43%; N, 33.66%.

EXAMPLE V

*6-(2-n-propoxyethylamino)purine*

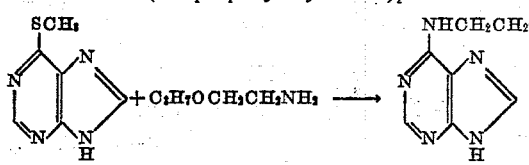

A solution of 10 parts of 6-methylmercaptopurine in 50 parts of 2-n-propoxyethylamine was heated under reflux for 6 hours. The excess amine was recovered by distillation at reduced pressure, and the residue recrystallized from ethyl acetate to give 8.13 parts of 6-(2-n-propoxyethylamino)purine, M. P. 174–176° C. Further recrystallization from ethyl acetate gave a pure product, M. P. 177–178° C.

Analysis.—Calculated for $C_{10}H_{15}ON_5$: C, 54.28%; H, 6.83%. Found: C, 54.33%; H, 6.76%.

EXAMPLE VI

*6-(2-n-butoxyethylamino)purine*

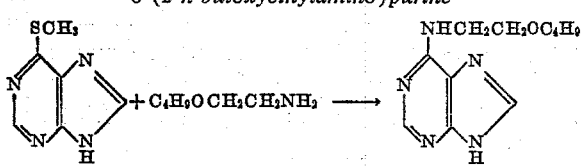

A solution of 8.13 parts of 6-methylmercaptopurine in 50 parts of 2-n-butoxyethylamine was heated under reflux for 6 hours. The excess amine was recovered by distillation at reduced pressure, and the residue recrystallized from ethyl acetate to give 9.82 parts of 6-(2-butoxyethylamino)purine, M. P. 184–185° C.

Analysis.—Calculated for $C_{11}H_{17}ON_5$: C, 56.15%; H, 7.27%. Found: C, 56.12%; H, 7.41%.

EXAMPLE VII

*6-(3-methoxypropylamino)purine*

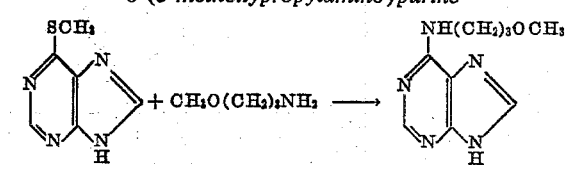

A solution of 10 parts of 6-methylmercaptopurine in 50 parts of 3-methoxypropylamine was heated under reflux for seven hours. The solution was concentrated to a small volume by evaporation under reduced pressure and then diluted with diethyl ether. The solid was recrystallized from ethyl acetate to give 7.8 parts of 6-(3-methoxypropylamino)purine, M. P. 182–183° C.

Analysis.—Calculated for $C_9H_{13}ON_5$: C, 52.26%; H, 6.32%. Found: C, 52.43%; H, 6.33%.

EXAMPLE VIII

*6-(2-methylthioethylamino)purine*

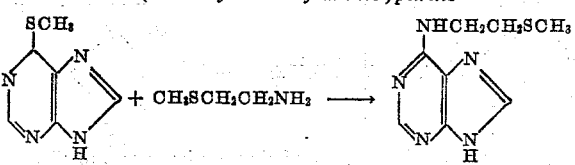

A solution of 10 parts of 6-methylmercaptopurine in 37 parts of 2-methylthioethylamine was heated under reflux for six hours. The excess amine was recovered by distillation at reduced pressures and the residue recrystallized from dilute ethanol to give 8.8 parts of impure product. The pure 6-(2-methylthioethylamino)purine, M. P. 195–196° C., was obtained by recrystallization from chloroform.

Analysis.—Calculated for $C_8H_{11}N_5S$: C, 45.88%; H, 5.30%. Found: C, 45.81%; H, 5.46%.

EXAMPLE IX

*2,8-dichloro-6-(2-methylthioethylamino)purine*

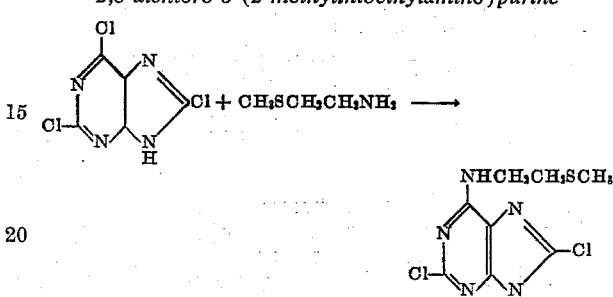

A solution of 11.2 parts of 2,6,8-trichloropurine and 10 parts of 2-methylthioethylamine in 50 parts of water was heated under reflux for 30 minutes. After cooling, the solution was brought to pH 6–7 with a few drops of concentrated hydrochloric acid and chilled. The precipitate was recrystallized from methanol to give 7.8 parts of impure 2,8-dichloro-6-(2-methylthioethylamino)purine, M. P. 175–197° C. The pure product, M. P. 214.5–217° C., was obtained by recrystallization from ethyl acetate.

Analysis.—Calculated for $C_8H_9Cl_2N_5S$: C, 34.54%; H, 3.26%; Cl, 25.49%. Found: C, 35.46%; H, 3.52%; Cl, 25.87%.

Plant growth was observed by culturing sterile duckweed plants under aseptic conditions under illumination in a solution of mineral salts (Hoaglund's Nutrient Solution—see Proc. Am. Soc. Hort. Sci. 30, 288 (1933); Vitamin Supplement: J. Agri. and Food Chem. 2, 178–182 (1954). The composition of the nutrient solution follows:

*Hoaglund's nutrient solution*

| Compound: | Conc'n in g./liter |
|---|---|
| $Ca(NO_3)_2$ | 364 |
| $MgSO_4 \cdot 7H_2O$ | 217.6 |
| $KH_2PO_4$ | 62.08 |
| $KNO_3$ | 221.28 |
| $H_3BO_3$ | 1.269 |
| $MnSO_4$ | 0.609 |
| $ZnSo_4$ | 0.0974 |
| $CuSO_4 \cdot 5H_2O$ | 0.0354 |
| $(NH_4)_6Mo_7O_{24} \cdot 4H_2O$ | 0.0390 |

To this nutrient solution after 400 fold dilution, sucrose was added to give a concentration of 2% and the following vitamins to give concentrations as follows:

| | Micrograms/l. |
|---|---|
| Thiamin | 100 |
| Pyridoxin hydrochloride | 800 |
| Nicotinamide | 800 |

Table I shows the average growth of a Spirodela species of duckweed in five flasks in each of which a single frond of the plant had been placed after 7 and 11 days at 30° C. under illumination of about 450 foot candles and to which the specified purines were added to the above nutrient solution at a concentration of one part per million. The growth was measured in two ways; first, by the number of fronds present in seven days, and second by the dry weight in milligrams of the plants at the end of eleven days. Table II shows growth determined with additional compounds over a 6-day period, except for the methoxypropyl derivative (last item) which was run for eight days.

TABLE I

| Purine Compound Added (1 p. p. m.) | Plant Growth | |
|---|---|---|
| | Frond No. (7 days) | Dry Weight (mg.) (11 days) |
| None (control) | 20.8 | 23.8 |
| 6-(2-methoxyethylamino)purine (Example II) | 22.4 | 39.5 |
| 6-(2-ethoxyethylamino)purine (Example IV) | 20.2 | 38.5 |
| 2,8-dichloro-6-(2-methoxyethylamino)purine (Ex. III) | 25.8 | 61.1 |
| 6-(2-methylthioethylamino)purine (0.1 p. p. m. Ex. VIII) | 24.8 | |

The latter compound gave a 55% increase in dry weight in seven days as compared to a control. It was employed at a tenth of the concentration of the others. In a similar manner 2,8-dichloro-6-(2-methylthioethylamino)purine (Example IX) when employed at 0.1 p. p. m. gave a dry weight increase of 15% in seven days as compared to a control.

In contrast to the above results, the use of 6-(2-morpholinoethylamino)purine gave substantially no more growth than the control.

TABLE II

| Purine Added and Conc'n. | Frond No. (6 days) | Dry Weight (mg.) (6 days) |
|---|---|---|
| None (control) | 21 | 3.3 |
| 6-(2-n-butoxyethylamino)purine (Example VI), 1 p. p. m | 21.8 | 3.97 |
| 6-(2-n-butoxyethylamino)purine (Example VI), 5 p. p. m | 22.4 | 4.38 |
| 6-(3-methoxypropylamino)purine (Example VII), 1 p. p. m | 23 (8 days) | 4.41 (8 days) |
| 6-(3-methoxypropylamino)purine (Example VII), 5 p. p. m | 25 | 4.92 |

In a similar plant growth test in which a Lemna species of a duckweed miniature plant was employed, a concentration of one part per million of 6-($\beta$-hydroxyethylamino)purine (Example I) increased the number of plants growing in 14 days to 21. When no purine was added the number increase was only 13.

In addition to the growth stimulation effect that the compounds have for plants as described above, they are also, in general, inhibitors for the growth of other plants, especially *Arapadopsis thaliana*, a member of the mustard family. For example, young plants of this species were transplanted into growth media containing 1 p. p. m. of each of the following compounds:

6-(2-methoxyethylamino)purine,
6-(2-ethoxypropylamino)purine,
6-(2-propoxyethylamino)purine, and
6-(2-methylthioethylamino)purine.

The growth of the plants was inhibited markedly as contrasted to controls; the size of the inhibited plants being substantially half of control plants in seven days. The compound 2,8-dichloro-6-(2-methylthioethylamino)purine likewise inhibited this mustard plant. In contrast to these results 6-(2-aminoethyl)purine and 6-(2-morpholinoethylamino)purine did not alter the rate of growth of the plants.

The present invention is generic to new purines having a $NH(CH_2)_nY(CH_2)_mH$ group in the 6-position wherein Y is oxygen or sulfur, i. e., a chalcogen of atomic number no greater than 16, $n$ is a plural integer up to 3, i. e. having a value of 2 to 3, and $m$ is a cardinal number up to 4, i. e., 0–4. The 2- and 8-positions of the purine ring can be unsubstituted or contain groups compatible with the amino substituent in the 6-position, e. g., chlorine. The compounds have the structure

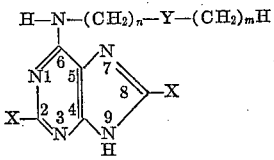

wherein X is hydrogen or chlorine, Y is oxygen or sulfur and $n$ and $m$ have the values as previously defined.

The compounds of this invention are obtained by the reaction of a purine having a lower alkylmercapto group in the 6-position with a primary amine which has an aliphatic chain of two to three carbons attached to nitrogen and also has a hydroxy, thiol, alkylthiol or alkoxy group, attached to carbon not directly bonded to the amino nitrogen. Purines of this invention having chlorine in the 2- and/or 8-positions are preferably obtained by the reaction of such a purine having chlorine also in the 6-position with a primary amine as defined above.

As shown in the examples, the amine reacts with a purine containing an alkylmercapto or chloro substituent in the 6-position. The temperature of the reaction is generally of the order of 50–225° C. and preferably 100–175° C. with times of generally fifteen minutes to about 50 hours. Although inert solvents or diluents can be present they are not necessary. Excess amine can be used as the reactant and solvent.

The new purines of this invention are purified by crystallization from such solvents as alcohol, ethyl acetate or dimethylformamide. The compounds have physiological activity. For example, in concentration of from 0.01 to 100 parts per million in inert diluents, the growth of plants, such as duckweed, and of plant tissue, particularly carrot callous root tissue, is regulated. The compounds of this invention are generally useful in increasing the rate and amount of plant growth. This increases the available organic matter for feeding animals, e. g., plants which are grown in an aqueous media for use for water feeding fowl or land grasses to which the plant regulants are applied in low concentration for feeding herbivorous animals. The compounds are inhibitors for the growth of certain plants. They are useful when applied to the soil in low concentrations as a pre-emergence inhibitor for broad-leafed plants.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A purine of the formula

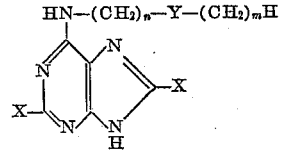

wherein $n$ is a plural integer not greater than 3, $m$ is a cardinal number not greater than 4, X is a member of the class consisting of hydrogen and chlorine and Y is a member of the class consisting of oxygen and sulfur.

2. 6-(2-hydroxyethylamino)purine.
3. 6-(2-ethoxyethylamino)purine.
4. 2,8-dichloro-6-(2-methoxyethylamino)purine.
5. 6-(3-methoxypropylamino)purine.
6. 6-(2-methylthioethylamino)purine.

No references cited.

UNITED STATES PATENT OFFICE
CERTIFICATE OF CORRECTION

Patent No. 2,844,577                                                                 July 22, 1958

Donald S. Acker

It is hereby certified that error appears in the printed specification of the above numbered patent requiring correction and that the said Letters Patent should read as corrected below.

Column 2, line 69, for "As solution" read --A solution--; line 70, for "under a reflux" read --under reflux--; column 4, line 52, for "ZnSo$_4$" read --ZnSO$_4$--.

Signed and sealed this 14th day of October 1958.

(SEAL)
Attest:

KARL H. AXLINE                                                         ROBERT C. WATSON
Attesting Officer                                                   Commissioner of Patents